J. M. LOOKER.
PLOW.

No. 189,636. Patented April 17, 1877.

WITNESSES:
E. Wolff.
J. H. Scarborough.

INVENTOR:
J. M. Looker.
BY
ATTORNEYS.

UNITED STATES PATENT OFFICE.

JOHN M. LOOKER, OF ABILENE, KANSAS.

IMPROVEMENT IN PLOWS.

Specification forming part of Letters Patent No. 189,636, dated April 17, 1877; application filed February 26, 1877.

*To all whom it may concern:*

Figure 1:
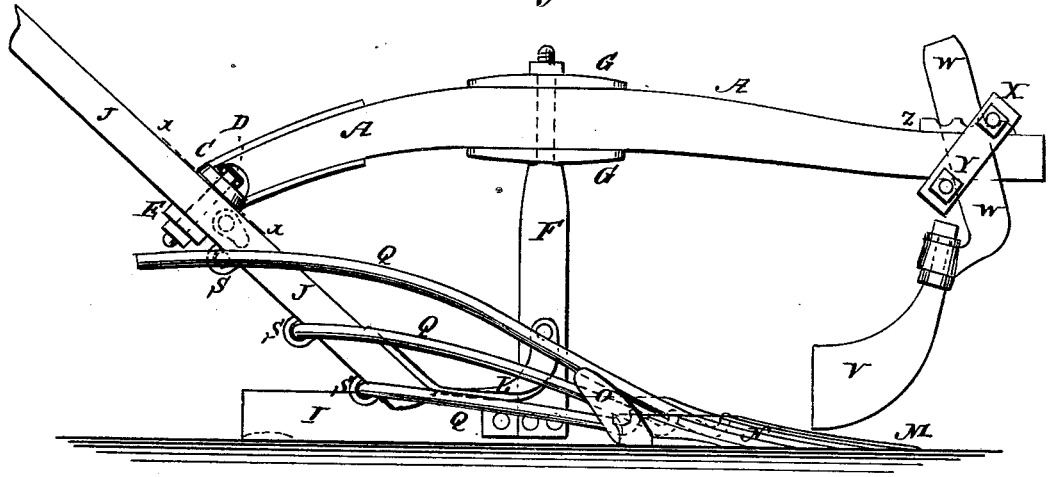
Figure 2:
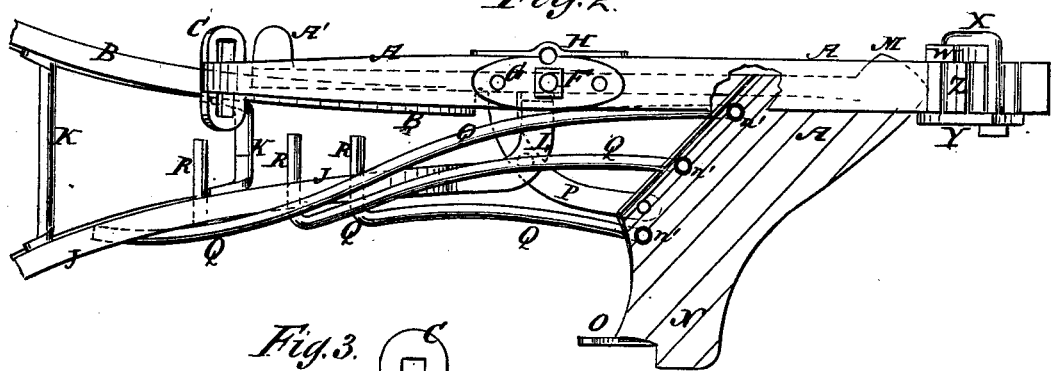
Figure 3:
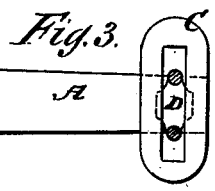
Figures 4, 5:
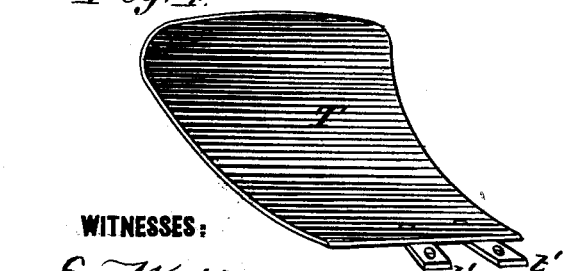

Be it known that I, JOHN MILTON LOOKER, of Abilene, in the county of Dickinson and State of Kansas, have invented a new and useful Improvement in Plows, of which the following is a specification:

Figure 1 is a side view of my improved plow. Fig. 2 is a top view of the same. Fig. 3 is a detail sectional view of the device for securing the rear end of the plow-beam, taken through the line $x$ $x$, Fig. 1. Fig. 4 is a detail view of the mold-board for stubble or other old land. Fig. 5 is a detail view of the mold-board for sod or new land.

Similar letters of reference indicate corresponding parts.

The object of this invention is to furnish an improved plow which shall be so constructed that it may be readily adjusted for the different kinds of plowing, and to take and leave land, and which shall be simple in construction, effective in operation, and of lighter draft than ordinary plows turning a narrower furrow.

The invention consists in a plow provided with an arrow-head point having its land-side wing projecting beyond the line of the land-side of said plow; and in the share formed solid with the arrow-head point, made nearly flat, and having the outer part of its forward edge curved forward.

A is the plow-beam, the rear end of which is secured adjustably to the land-side handle B. C is a small plate, which is slotted longitudinally, and has arms formed upon the middle part of its side edges to fit upon and be secured to the upper and lower sides of the rear end of the beam A. The rear end of the beam A is grooved transversely to receive the cross-head formed upon the bend of the clip D, the arms of which pass through the slot of the plate C, pass back upon the opposite sides of the land-side handle B, pass through the holes in the yoke E, and have nuts screwed upon their ends, so that by loosening the nuts of the clip D the rear end of the beam A may be adjusted laterally to cause the plow to take or leave land, as may be desired. F is the standard, the upper part of which is rounded, passes up through a hole in the beam A, and has a nut screwed upon its upper end.

This construction allows the beam A to turn upon the standard F as a pivot when adjusting the plow to take or leave land.

To the upper and lower sides of the beam A are attached washer-plates G, to prevent wear, and to strengthen the beam where it is weakened by forming the hole through it for the standard F. To the land-side side of the beam A is attached a socket-plate, H, to receive the rounded upper end of the standard F to adjust the plow for an uneven draft, or when three horses are used abreast. The lower end of the standard F is bolted or riveted to the land-side I, to which is also bolted or riveted the lower end of the land-side handle B. J is the mold-board side handle, which is connected with the handle B by rounds K, and to its lower end is bolted the end of the curved bar L, the other end of which is bolted or riveted to the lower part of the standard F. To the forward end of the land-side I is welded or otherwise secured the arrow-head point M. The other side or wing of the point M is extended to form the share N, which is nearly flat, and the edge of which, for about three-fourths its length from the point M, inclines to the rearward, and then turns forward with a curve more or less abrupt, and terminates in an angular point.

This construction makes the plow run more steadily, and enables the share to be made to cut a furrow of the desired width without being made too long.

Upon the rear part of the outer end of the share N, and at a little distance within said end, is formed an upright cutter, O, to enable a furrow to be opened in unbroken sod with the plow-level. The land side wing of the arrow-head point M projects beyond the line of the land-side I and the colter, to give steadiness to the plow. For the same purpose a wing, lug, or horizontal cutter, A', is formed upon the side of the heel of the land-side I, and which follows in the path of the wing of the point M. The outer part of the share N is supported against the draft-strain by the curved bar P, the forward end of which is bolted or riveted to the rear outer part of the said share N, and its rear end is bolted or riveted to the land-side I. In the share N, near its rear edge, are formed three holes, $n'$, to receive the hooks or bolts formed upon the forward ends of the rods Q, which are so curved as to form a skeleton mold-board. Upon the rear parts of the rods Q are formed, or to them are attached, arms R, projecting at right angles to pass through the eyes of eyebolts S, or other keepers, attached to the rear side of the mold-board handle J to support the said rods.

By this construction, by moving the rear ends of the curved rods Q outward, their forward ends may be disengaged from the share N.

T is the stubble or old land mold-board, which is made wide and comparatively short, and the forward edge of which is so formed as to fit against the rear edge of the share N. To the under side of the forward edge of the mold-board T are bolted or riveted straps $t'$, in such position as to underlap the rear part of the share N directly beneath the holes $n'$, so that the bolts that secure them to said share N may pass through the said holes $n'$. U is the sod or new land mold-board, which is made long, narrow, and with spiral curve, to adapt it to better turn the sod. The forward edge of the mold-board U is provided with straps $u'$, to adapt it to be secured to the share N in the same way as the mold-board T. V is the colter, the cutting-edge of which is curved downward and rearward, as shown in Fig. 1, so as to operate with a drawing cut. The colter V is swiveled to the lower end of the standard W, which lower end is bent to the rearward to bring it into proper position to receive the stem of the colter V. The standard W is secured to the side of the beam A by a clip, X, and yoke Y. The upper arm of the clip X rests upon a corrugated plate, Z, attached to the upper side of the plow-beam A, so that the position of the colter V may be adjusted as desired.

The colter V and standard W may be rigidly connected together, or formed in one piece, if desired.

Having thus described my invention, I claim as new and desire to secure by Letters Patent—

1. A plow provided with an arrow-head point, M, having its land-side wing projecting beyond the line of the land-side of said plow, substantially as herein shown and described.

2. The share N, formed solid with the arrow-head point M, made nearly flat, and having the outer part of its forward edge curved forward, substantially as herein shown and described.

JOHN MILTON LOOKER.

Witnesses:
W. H. WHITEHURST,
T. B. MORLEY.